United States Patent [19]
Forster

[11] 3,873,830

[45] Mar. 25, 1975

[54] METHOD AND APPARATUS FOR MONITORING THE QUALITY OF WELDS IN SEAMED TUBES

[76] Inventor: Friedrich M. O. Forster, Grathwohlstrasse 4, Reutlingen, Germany

[22] Filed: Sept. 22, 1972

[21] Appl. No.: 291,297

[30] Foreign Application Priority Data
Dec. 22, 1971  Germany............................ 2163627

[52] U.S. Cl................ 250/236, 73/15 R, 73/355 R, 73/356, 148/128, 250/209, 250/226
[51] Int. Cl............................................ G01b 19/37
[58] Field of Search............... 73/15 R, 355 R, 256; 219/109, 110; 228/9; 148/128; 250/209, 226, 236

[56] References Cited
UNITED STATES PATENTS
2,989,642   6/1961   Svec................................ 250/236 X

*Primary Examiner*—Richard C. Queisser
*Assistant Examiner*—Frederick Shoon
*Attorney, Agent, or Firm*—Ervin B. Steinberg

[57] ABSTRACT

A method and apparatus for investigating the possible existence of paste weld condition in the seam of a welded tube comprises scanning the area of the weld transverse to the axis of the seam with photo sensitive means. In one embodiment the seam and adjacent area are scanned immediately after welding while the seam is still incandescent and a signal commensurate with the maximum temperature sensed is produced, or alternatively an area integrated temperature responsive signal is developed. In another embodiment, after the tube has cooled the area of blue metal discoloration surrounding the weld seam is scanned and a color responsive temperature related signal is produced. In all instances, a signal falling below a predetermined level indicates that the seam area failed to attain a sufficiently high temperature during the preceding welding process, hence giving rise to the possibility of a paste weld condition.

4 Claims, 11 Drawing Figures

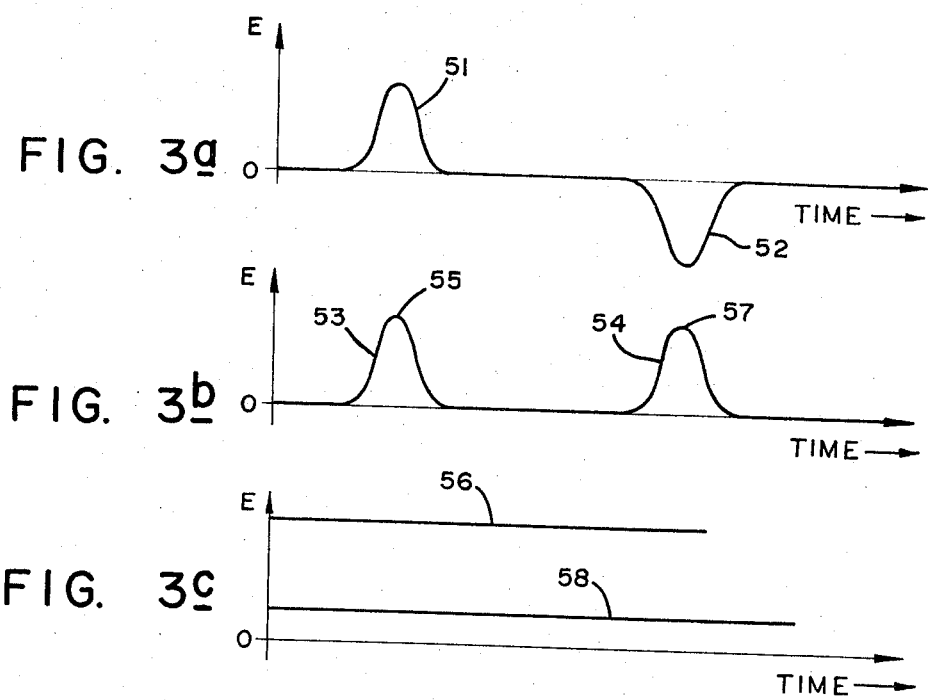
FIG. 3a
FIG. 3b
FIG. 3c
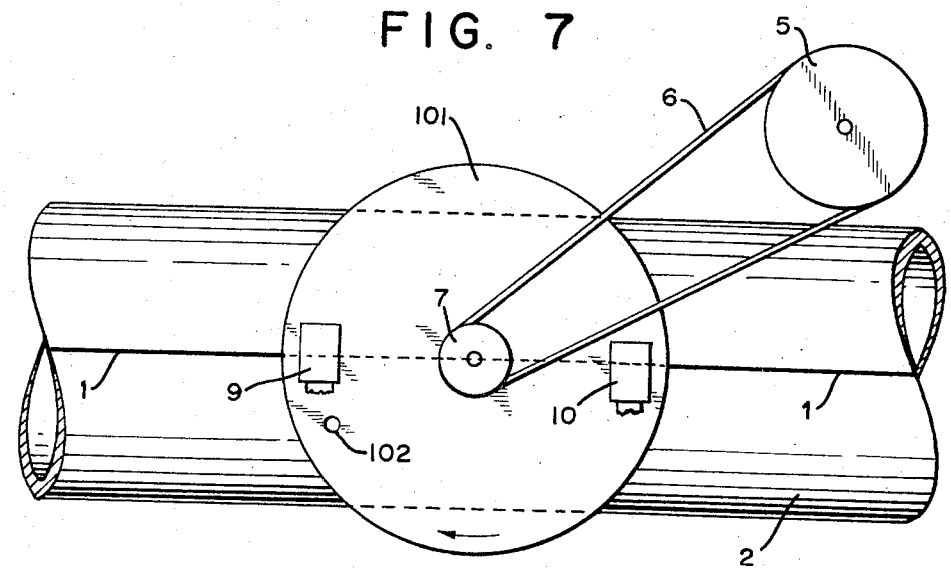
FIG. 7

METHOD AND APPARATUS FOR MONITORING THE QUALITY OF WELDS IN SEAMED TUBES

BACKGROUND OF THE INVENTION

The invention concerns a method and apparatus for continuously and nondestructively monitoring the uniform quality of the seam of welded tubes especially with respect to the occurrence of paste weld condition, i.e., insufficient fusing.

Considering price, the fabrication of welded tubes is generally more advantageous than that of seamless tubes. Therefore, there is ever increasing use of continuously seamed tubes made from suitably rolled and bent sheets. Several known nondestructive test methods make it possible to indicate in a satisfactory manner defects in the seam of tubes when discontinuities are present in the workpiece. However, no completely satisfactory method is known for indicating defects caused by a "paste weld" condition which occurs primarily with the induction weld method. Using this latter method for fabricating tubes, a non-welded sheet bent to assume the shape of a tube is fed through a coil which is excited by a high frequency alternating current of large amplitude. As the tube is fed through the coil the edges of the non-welded tube are pressed into abutting contact. The formed sheet at the location of the coil acts in the manner of a short-circuited winding of a transformer whose primary winding is the coil. To achieve improved inductive coupling between the coil and the tube circumference, a cylindrical core is disposed coaxially within the tube at the weld location. The core preferably is made of ferrite material and is usually water cooled.

On account of the relatively high contact resistance at the location where the edges of the metal sheet are in abutting contact the induced short circuit current flowing at that location generates a large amount of thermal energy. In this manner both edges melt and a fusion weld is achieved. If for some reason the thermal energy produced by the conversion of electrical energy is diminished, such as may be caused by a reduction of the exciting current, insufficient pressure against the tube edges, or a dislocation or wear of the core, the available thermal energy no longer is sufficient for maintaining the metal in a molten state over the entire weld area. While there still will be achieved a surface weld across the edges of the tube, for the greater portion of the weld area there will be insufficient molten material which never exceeds a pasty or viscous condition. The grain structure resulting from this condition will be characterized by insufficient dispersement of the constituents. The outcome is a reduced, sometimes substantially diminished, strength of the weld seam.

Unfortunately, the above described weld defect, a so-called paste weld condition, can be detected only with great difficulty. It manifests itself not as a discontinuity in the workpiece but is recognized only with difficulty by a mat appearance of the grain structure in the course of a metallographic examination. The well known nondestructive test methods, that is, eddy current, magnetic flux and ultrasonic methods fail when being used for determining the above described defect.

The above difficulties are still further aggravated by investigations conducted by the present inventor. It has been found that generally the outer zone of the weld seam is free of any defects even under the condition when the paste weld condition is present to a high degree. This outer zone of the weld seam, in most cases, is responsible for preventing the bursting of the tube under water pressure test, although paste welding is present.

The acceptability of welded tubes and the presence of a paste weld condition is established most commonly by flaring the end of the tube under test over a cone of a predetermined angle. Only if the tube bursts at a location other than the weld is it certain that there is an absence of a paste weld condition.

Unfortunately, the above process is afflicted with all of the disadvantages of a destructive test method and, moreover, the entire length of the weld seam cannot be tested in this manner.

A method described in German Pat. application No. P 1 648 471 provides two pairs of rollers arranged consecutively and positioned to engage the tube under test as the tube is fed through the rollers. The first pair of rollers compress the tube in the direction normal to the weld seam plane and the second pair in the direction of the weld seam plane and preferably to such a degree that the small plastic deformation caused by the first set of rollers is cancelled by the second set of rollers. In this manner, sequentially the external and internal zones of the weld seam are subjected to tensile stress. A test following the pressure roller deformation using one of the known nondestructive test methods has the purpose of revealing paste welded seams which have burst open as the result of the applied tensile stress.

It has been determined, however, that this method is not universally applicable. Particularly in the case of thin-walled tubes it may occur that the deformation pressure applied by the above stated rollers is insufficient to cause a bursting of seams having the paste weld condition. Specifically when the acceptance specification provides for stressing the tube under expansion to its yield point a sufficient deformation by means of pressure rollers cannot be carried out.

There exists, therefore, especially when extreme acceptance specification must be met, a great need for a method which in a continuing manner determines the presence of paste welding in tubes without requiring the deformation of the tube. The present invention concerns itself with a method and apparatus for solving this need.

In the instant invention it is assumed that the paste weld condition occurs only when the minimum of the conversion of heat energy necessary in the weld seam for obtaining a sufficient degree of coalescence is not reached. Hence, it is desirable to find a measurable quantity which is directly related to the heat energy dissipated in the weld seam.

At a first glance it would seem possible to utilize for this purpose the electrical energy appearing in the induction coil, which energy is transformed to thermal energy. Upon closer examination it will be apparent, however, that this approach is not possible since only a portion of the electrical energy flowing through the induction coil during the induction welding process appears as heat energy in the weld seam. For instance, if the core becomes dislocated or worn, the current induced in the tube cross-section is reduced and hence also the voltage drop E across the resistance R represented by the weld location, which is a measure of the energy $E^2/R$ transformed into thermal energy, is decreased. Moreover, a reduction of the exciting current in the induction coil and a simultaneous increase of the power loss at other areas of the secondary circuit cannot be observed by monitoring the exciting current. Therefore, it is quite apparent that a measurement of the electric parameters does not provide a value for the energy actually transformed into thermal energy at the weld location.

It has been proposed in a previous German Pat. No. DT-PS 890,878 to provide prior to welding on the exterior tube surface at which the weld is to occur heat sensitive paint which changes its color at a predetermined temperature and thereby establish a visual indication whether the minimum temperature required for a defect-free weld has been obtained. This method is afflicted with several deficiencies. In order to use this method in a satisfactory manner, a large assortment of heat sensitive paints with different temperature responsiveness must be available. Furthermore, it is not possible with the described method to automatically control a welding apparatus in view of the absence of an electrical signal indicative of the condition when the minimum temperature falls below a value necessary for obtaining a defect-free weld. Another disadvantage resides in the fact that not only the temperature of the weld location, but also locations adjacent the weld are monitored. Further, the paint is readily damaged and scraped off during removal of the weld bead. Finally, the foregoing method fails to provide for the possibility of continuous temperature measurement. Rather, such paint is useful only to determine whether a minimum temperature has been obtained or, if two paints with different temperature responsiveness are used, it can be observed only whether a predetermined temperature range has been reached.

SUMMARY OF THE INVENTION

The present invention includes the feature of arranging one or more probes along at least a portion of the tube surface in the vicinity of the weld seam and causing the probes to scan the tube surface in a direction transverse to the seam while providing simultaneously relative motion between the tube surface and the probe or probes in a direction parallel to the axis of the weld seam. The probe or probes are adapted to develop continuously during scanning a signal which is responsive to the maximum temperature present in the scanned seamed tube surface region and/or to develop a signal which is the integral of the temperature distribution within the scanned surface region, such signal being a measure of the energy converted to heat in the weld seam.

In one of the preferred embodiments of the present invention, a rotating or reciprocating infrared sensitive sensing means is positioned for scanning the area adjacent to the weld seam in a direction transverse to the axis of the seam as the seam progressively advances in the course of its manufacture. The sensing means is located downstream from the welding station and weld bead removal, but ahead of the cooling area.

The infrared sensing means makes it possible to accurately determine the instantaneous value of the temperature exhibited by the scanned surface. The energy dissipated in the weld seam normally causes molten material which forms the weld. On solidification of the weld, this energy becomes the solidification heat which diffuses into the area surrounding the weld seam. Prior to the time that the tube, in the course of the manufacturing process, reaches the cooling area, a relatively uniform distribution of the temperature throughout the tube wall thickness occurs, even with heavy wall thickness, and this phenomenon permits the integral of the localized temperature distribution present in the scanned portion of the tube circumference to be utilized as a measure of the thermal energy dissipated in the weld seam during the preceding welding process. If the signal commensurate with the integrated value falls below a predetermined amplitude, a control signal can be generated which indicates the danger of paste welding.

The use of the integrated signal as a measure of the dissipated thermal energy within the weld seam has the advantage that the measurement is largely insensitive with respect to the velocity of the tube feed. Only a small portion of the thermal energy of the weld seam is directly given off as heat radiation from the weld seam. In contrast, due to the good thermal conductivity of the tube material the major portion of the thermal energy is conducted into the region adjacent to the weld seam. If the time interval between welding and scanning of the weld location by the infrared sensing means increases, the resulting drop of the peak value of the surface temperature is substantially counteracted by the attendant increased spread of the temperature distribution. Hence, the integrated value is largely maintained constant.

In some instances the peak value of the temperature distribution along the scanned area may be considered directly as a measure of the heat dissipated in the weld seam. This applies particularly when the tube feed between the weld location and measurement location has constant velocity.

For tubes made of shiny steel a still further arrangement is possible. The blue discoloration of the weld seam and its surrounding area as well as the width of such blue discoloration may be used to determine the amount of thermal energy dissipated during the welding process. The larger the thermal energy dissipated at the weld location, the higher the surface temperature of the tube during welding and the greater the width of the area which had been subjected to the temperature necessary to exhibit blue discoloration. If the thermal energy during welding was insufficient, the width of the zone showing blue discoloration will be relatively small. If the necessary energy to obtain substantially defect-free welding falls far below the required level, the blue discoloration assumes a brownish or yellowish color and ultimately disappears altogether. In accordance with another aspect of the present invention the discoloration of the tube surface in the vicinity of the weld seam after cooling is sensed by means of a light responsive probe. If this probe has a spectral response in the red region, for instance, a blue discoloration will be sensed as substantially black. A brownish or shiny surface is read by the light sensitive probe with increasing sensitivity. If the output signal of the light responsive probe is integrated with respect to the scan distance, an integrated value is obtained which is directly a function of the thermal energy converted in the weld seam.

Other and still further embodiments of the present invention will be more clearly apparent from the following description when taken in conjunction with the accompanying drawing.

BRIEF DESCRIPTION OF THE DRAWING

FIGS. 3a, 3b and 3c illustrate typical wave shapes pertaining to the embodiment per FIGS. 1 and 2;

FIG. 7 is a plan view of an alternative embodiment of the arrangement shown in FIGS. 1 and 2.

DESCRIPTION OF THE PREFERRED EMBODIMENTS

Figure 1:
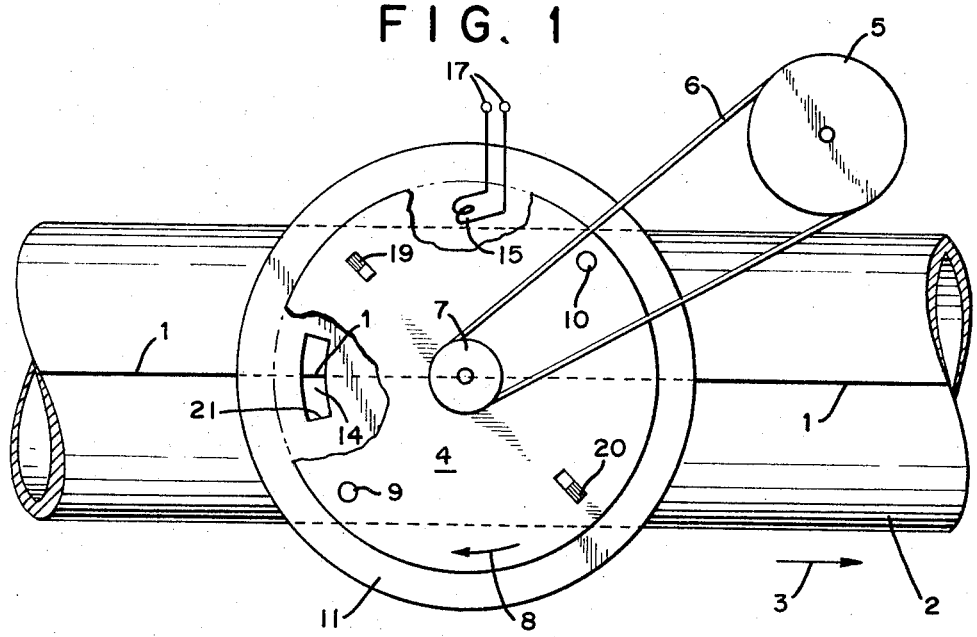
FIG. 1 is a schematic view of a typical embodiment of the invention.
Figure 2:
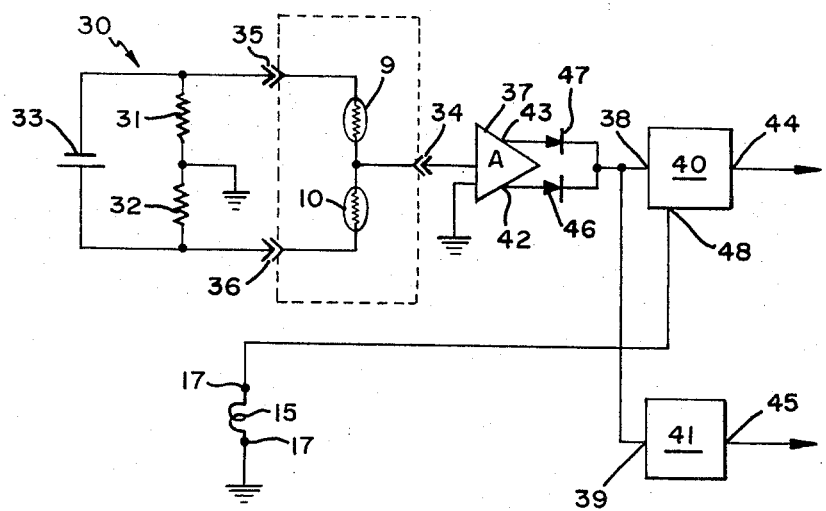
FIG. 2 is an electrical circuit block diagram of the arrangement per FIG. 1.

The embodiment per FIGS. 1 and 2 serves for sensing the surface temperatures in the vicinity of the weld seam 1 of the induction welded tube 2 which during manufacture is advanced along the direction indicated by arrow 3 between a welding machine (not shown) and a cooling area, also not shown. Two photoelectric sensing probes 9 and 10 responsive predominantly to infrared energy are mounted within a rotating disc 4 which is driven from a motor 5 via belt 6 and a pulley 7 to undergo rotation as indicated by the arrow 8. The probes are mounted so that their light responsive side faces toward the area disposed below. Underneath the disc 4 there is disposed a heat baffle 11 which has the purpose of shielding the disc 4 and the light sensitive probes 9 and 10 from the heat glow of the weld seam 1. As the disc 4 with probes 9 and 10 rotates, the probes cyclically pass above an aperture 14 in the baffle 11, the aperture being disposed directly above the weld seam 1. In this manner the probes 9 and 10 scan a portion of the tube surface in a direction transverse to the weld seam. An impulse coil 15 connected to a pair of terminals 17 is provided on the baffle 11 and disposed underneath the disc 4. Two permanent magnets 19 and 20 are mounted upon the disc 4 in such a manner that upon rotation of the disc 4 the coil 15 is cyclically swept by the magnets. The angular distance between the location of both probes 9 and 10 may be 180 degrees. The permanent magnet 19 is mounted to the disc 4 in such a manner that it is disposed above the coil 15 at the time the probe 9 traverses the leading edge 21 of the aperture 14. Similarly, the permanent magnet 20 is located on the disc 4 in such a manner that it is disposed above the coil 15 when the probe 10 is disposed above the edge 21 of the aperture 14.

FIG. 2 is an electrical block diagram of the arrangement per FIG. 1. Both infrared sensing probes 9 and 10 are connected in circuit with two resistors 31 and 32 to form a bridge connection which is energized from the direct current source 33. Mercury contacts 34, 35 and 36 connect the infrared sensitive probes 9 and 10 disposed on the disc with the stationary portion of the electrical circuit. The output signal from the bridge connection 30 is coupled via the contact 34 as input to the amplifier 37 whose symmetrical output lines 42 and 43 include a full wave rectifier 46 and 47 and then are connected to each other. The output signal from the rectifier is connected to the input 38 of a peak value storage circuit 40 as well as an input 39 to an integrating circuit 41. One of the terminals 17 of the coil 15 is grounded and the other terminal is coupled as a timing signal to the input 48 of the peak value storage circuit 40. The outputs 44 and 45 of the peak value storage circuit 40 and of the integrating circuit 41 are coupled to respective analyzing circuits which may include a recording means as well as an amplitude discriminating means or both.

This arrangement operates in the following manner: While the welding seam 1 to be checked passes in the direction of the arrow 3 underneath the baffle 11, the disc 4 rotates, being driven by the motor 5. The bridge circuit 30 is dimensioned and calibrated so that no voltage appears on contact 34 as long as the infrared probes 9 and 10 are disposed above the opaque portion of the heat baffle 11. The probes suitably comprise resistive means of the lead sulfide type, sensitive to infrared radiation. As soon as the probe 9 has passed the edge 21 of the aperture 14, the probe receives energy radiated from the vicinity of the weld seam and consequently changes its resistance. This change causes an unbalance of the bridge circuit 30, providing an output voltage as shown by the wave shape 51 in FIG. 3. The output signal increases rapidly until the probe 9 receives a maximum of the heat radiation manifest above the weld seam and then decreases substantially in the same manner. A similar voltage pulse 52 with reversed polarity follows one half revolution later when the probe 10 traverses the aperture 14. These voltage pulses 51 and 52 are cyclically repeated with each revolution of the disc and after being suitably amplified by the amplifier 37 are rectified by the rectifying means 46 and 47. The pulse signals 53 and 54 of the same polarity provided by the rectifier are applied to the inputs 38 and 39 of the peak value storage circuit 40 and the integrating circuit 41 respectively. The peak value storage circuit 40 of conventional design receives the peak value 55 or 57 during a particular scan cycle and retains such value until the start of a succeeding scan cycle. Simultaneously with the start of a new scan cycle one of the permanent magnets 19 or 20 traverses the coil 15 which in response thereto produces a steep timing pulse. This pulse is transmitted to the input 48 of the peak value storage circuit for cancelling the signal stored from the preceding cycle. Cancellation of a stored signal produced during a preceding cycle and storage of a new peak value can be achieved without significant pause so that in the event of peak values of constant amplitude there is provided at the output end 44 of the storage circuit 40 a continuous direct current signal 56 whose amplitude is proportional to the peak value. This output voltage, being a measure of the thermal energy dissipated at the weld location, can be fed to a recording means which affixes markings corresponding to the voltage signal upon a paper chart. Similarly or concurrently therewith, the output signal 56 can be fed to an amplitude discriminating means which provides an alarm signal if the applied signal falls below a predetermined value and such signal can be used to shut down the welding apparatus or to initiate suitable control measures.

The integrating circuit 41, quite conventionally, includes a low-pass filter which suppresses high frequency components present in the pulse signals 53 and 54 and provides at its output end 45 an integrated signal value responsive to the average voltage value of the direct current signal 58 which is a function of the pulse signals 53 and 54. The value of the integrated signal also can be considered to be a measure of the thermal energy dissipated at the weld location and utilized in the same manner as described above in conjunction with the signal produced at the output end 44.

Alternatively, instead of the low pass filter an electronic integrating circuit may be used. In this modification the integrating process can be started upon receipt of the pulse signals from the coil 15.

Figure 4:
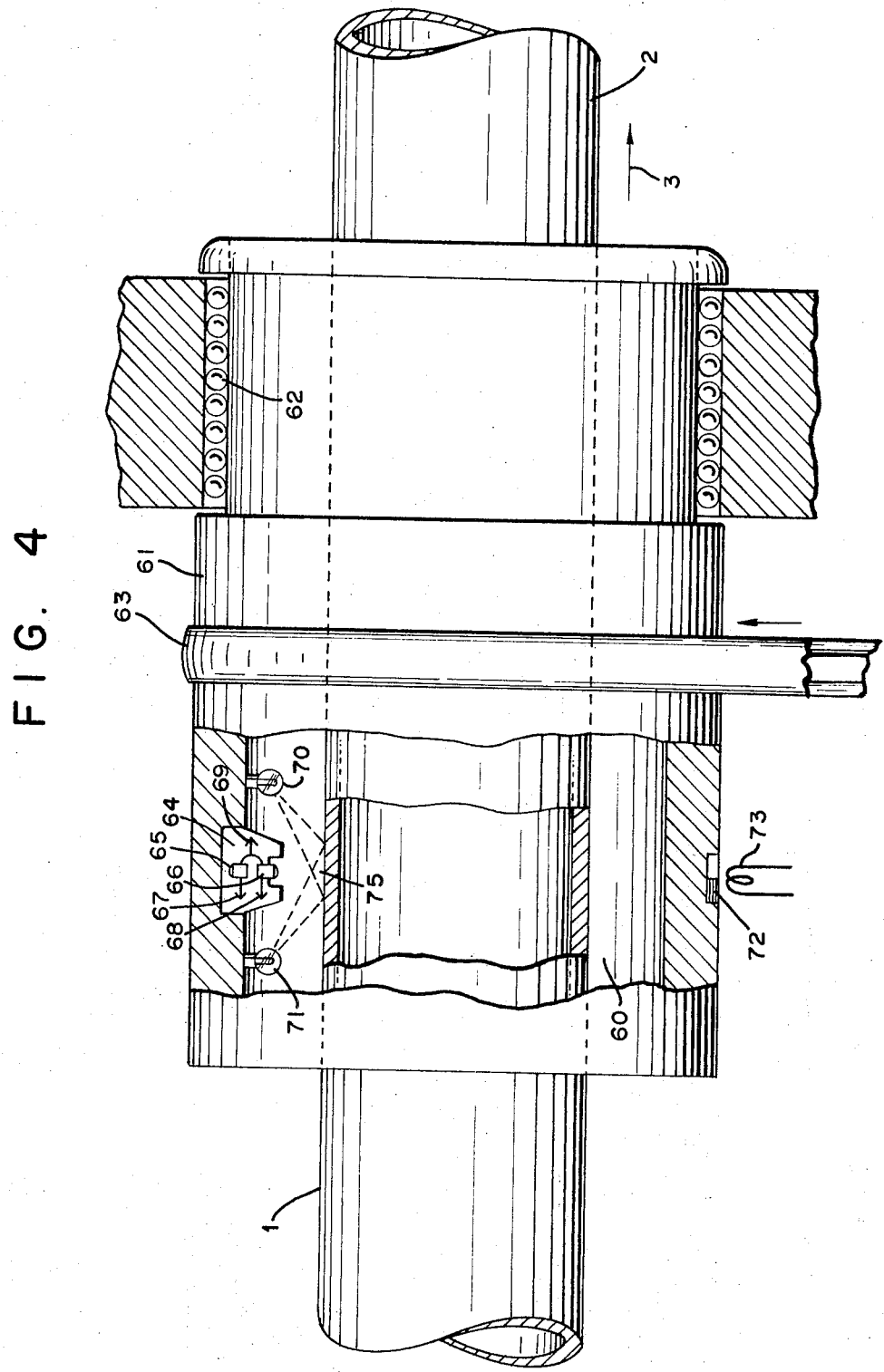
FIG. 4 is a side view of a further embodiment of the invention.

The arrangement per FIG. 4 is adapted to scan the discolored region surrounding the weld seam. In this embodiment the test is carried out after the tube has passed through the cooling region associated with the weld seam producing apparatus thereby causing the tube to attain the ambient temperature at an accelerated rate. The tube 2 which includes the weld seam 1 to be tested is fed through the bore 60 of a cylindrical rotatable head 61 journalled in bearing 62 and rotatable via a flexible drive belt 63 from a motive means not shown. Two photo responsive resistance means 65 and 66 are mounted to a support 64 which is fastened to the inside of the rotating head. The photo responsive resistance means are selected to exhibit maximum spectral sensitivity within the red region of the visible light spectrum. The light responsive side of the photo means 66 faces the surface of the tube 2 and the light responsive side of the photo means 65 is shielded. Both photo responsive resistance means are connected via terminals 67, 68 and 69 in a half bridge circuit. As seen in the direction of tube feed, arrow 3, ahead and behind the support 64 there are mounted two lamps 70 and 71 which illuminate the tube surface area 75 located in view of the photo responsive means 66. The lamps 70 and 71 as well as the contact terminals 67, 68 and 69 of the half bridge circuit are connected by means of suitable slip ring contacts (not shown) provided on the rotating head with the stationary portion of the electrical circuit. A permanent magnet 72 is disposed on the exterior side of the rotating head at a location which is diametrically opposite to that of the photo responsive sensing means 65 and 66. At least the immediate wall portion of the rotating head surrounding the permanent magnet 72 is made of nonmagnetic material. An impulse coil 73 is mounted stationary at a location opposite the circular path travelled by the magnet 72.

Figure 5:
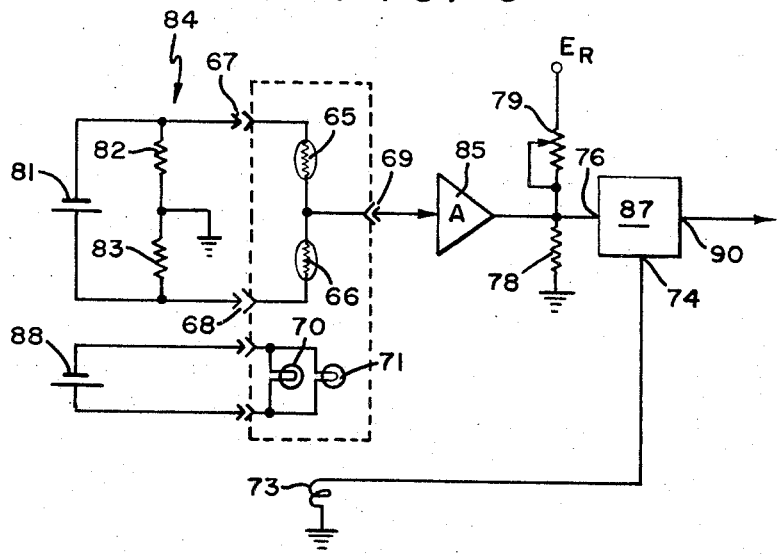
FIG. 5 is an electrical circuit block diagram of the embodiment per FIG. 4.

FIG. 5 shows the schematic electrical circuit useful in connection with the embodiment per FIG. 4. The direct current source 81 energizes a bridge circuit 84 which comprises the resistances 82 and 83 and the photo responsive resistance probes 65 and 66. A separate electrical power source 88 is provided for energizing both lamps 70 and 71. The output 69 of the bridge circuit is coupled to the input side of an amplifier 85 and the output of the amplifier 85 is connected as input 76 to an integrating circuit 87. A voltage divider comprising a resistance 78 and a potentiometer 79 makes it possible to provide a direct current bias voltage $E_R$, adjustable by potentiometer 79, to the input side 76 of the integrating circuit 87. The coil 73 is connected for providing a timing signal to the input 74 of the integrating circuit 87.

Figure 6A:
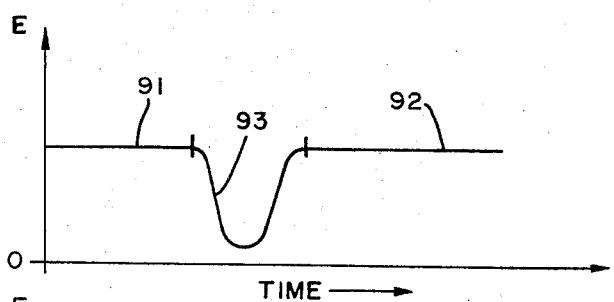
FIGS. 6a, 6b and 6c illustrate typical wave shapes pertaining to the embodiment per FIGS. 4 and 5.

The arrangement per FIGS. 4 and 5 operates as follows: Responsive to the operation of the rotating head and the tube being fed in the direction of the arrow 3 the photo responsive resistance probe 66 scans the surface of the tube 2 in a direction transverse to the axis of the weld seam 1. As long as a shiny non-discolored region 75 of the tube surface is disposed opposite the lamps 70 and 71 a large portion of the radiated light is reflected. Hence, the photo responsive means 66 receives a large portion of the light which causes the bridge circuit 84 to be changed from its balanced condition and develop a signal E as shown by lines 91 and 92, FIG. 6a, which signal via slip ring contact means 69 is coupled to the input of the amplifier 85. In contrast therewith, discolored regions of the weld seam reflect the light from both lamps 70 and 71 only to a minor extent. Particularly, an intensive blue discoloration permits only a very small portion of the red light spectrum to be discerned by the photo means 66, thus causing a condition approaching the zeroized state of the bridge circuit, that is, a signal reduction as shown at 93 in FIG. 6a which approaches zero. The width of the pulse signal producing a dip of the bridge circuit output signal E depends upon the width of the discoloration at the weld seam. By means of the potentiometer 79 a bias voltage signal is provided for balancing the direct current signal 91 and 92 generated responsive to a non-discolored tube surface portion and, hence, at the input end of the integrating circuit 87 there is apparent a signal as seen in FIG. 6b.

Figure 6B:
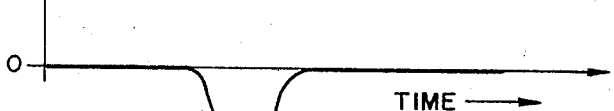
Figure 6C:
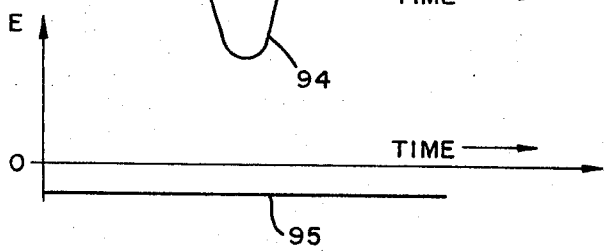

The pulse signal 94 as seen in FIG. 6b is integrated by the integrating circuit 87 to provide at the output end 90 of the integrating circuit 87 an integrated signal which is available as a direct current voltage 95 depicted in FIG. 6c. This direct current voltage is a measure of the heat energy dissipated in the weld seam. As previously stated, the integrating circuit 87 can be designed to include a low pass filter for providing an average value commensurate with the direct current voltage pulse 94. In this arrangement the permanent magnet 72 and coil 73 are not needed. However, if an active electronic integrating circuit is to be used, then the coil 73 upon being swept by the permanent magnet 72 generates a pulse signal which is fed to the input 74 of the integrating circuit 87 to serve as a start signal for the electronic integrating means.

Analysis and evaluation of the voltage signal provided at the output 90 can be carried out by the two arrangements recited hereinabove in connection with FIGS. 1 and 2. The present as well as the previous arrangement can be used also with probes scanning the weld seam in accordance with the invention herein for testing the seam using one of the known nondestructive test methods, such as eddy current test method or magnetic leakage flux test method. These methods can be employed simultaneously to test the weld seam for offset and other existing defects.

In the case of the last described scan arrangement of the blue colored region there is available also a relative simple method for deriving signals which are indicative of the displacement of the weld seam from a predetermined peripheral position. If the peripheral position of the weld seam remains constant as seen in the viewing plane, the peak value of the pulse signal 94, FIG. 6b, coincides with the induced pulse generated by the coil 73. The pulse signal 94 can be applied to a gate circuit having two outputs, one output being coupled to the input of the gate circuit until the timing pulse from coil 73 occurs, and the other output being coupled to the input of the gate circuit after the timing pulse from coil 73 has occurred. As long as the weld seam remains positioned without change both output signals from the gate are of equal width, each width corresponding to one half the signal 94. The pulse signals derived from both outputs of the gate can be integrated and compared with respect to one another. If there is a balance, the position of the weld seam remains constant. A difference of the integrated voltage signals is indicative of a drift of the weld seam which, depending on the polarity of the signals, corresponds to one or the other direction and, hence, can be used to control a seam tracking device.

In many cases the additional expenses caused by mounting infrared sensing means upon a rotating disc, necessitating circuit connection via slip rings, possibly mercury contacts, is undesired and cumbersome. In this event there presents itself an interesting solution which shall be described as an alternative embodiment of FIG. 1. This alternative arrangement is shown in FIG. 7.

Both infrared sensing means 9 and 10 are mounted stationary, in line with one another, above the weld seam 1 of the tube 2. The light sensitive sides of the sensing means face the tube surface in the area surrounding the weld seam. A rotatable disc 101 is disposed between the tube surface and both infrared sensing means 9 and 10, the disc is rotated via motive means 5, flexible belt 6 and pulley 7. The center of rotation of the disc 101 is disposed medially between both infrared sensing means 9 and 10. An aperture 102 in the disc 101 is rotated in such a manner that during rotation of the disc the aperture passes underneath the infrared sensing means. Moreover, the lower side of the disc 101 is constructed to cause it to reflect to a large extent the heat radiation emanating from the tube, specifically from the weld seam. The heat rays can pass toward the upper side of the disc and be incident upon the infrared sensing means 9 and 10 only when the aperture 102 is in registration with a respective sensing means. In all other respects this embodiment corresponds to the conditions outlined in conjunction with the description of FIGS. 1 and 2.

When the disc 101 rotates both infrared probes 9 and 10 for the greater portion of disc rotation are exposed to the uniform upper surface of the disc 101. The probes receive the same small amount of heat radiation and consequently, the bridge circuit is in its balanced state. If the aperture 102 approaches one of the two infrared probes 9 or 10, the respective infrared probe "sees," responsive to incremental rotation, a region of the tube surface, such region shifting closer to the zenith line of the tube circumference until momentarily the zenith line, disc aperture and infrared probe are disposed in a common plane. Subsequently, the scanned tube surface region recedes from the zenith line in the same manner. In this way, the weld seam which usually coincides with the zenith line of the tube 2 is scanned by infrared sensing probes 9 and 10 in a direction transverse to the weld seam axis without that the probes must be in motion. Analogous to the signals per FIG. 3a there will be for each scan revolution of the disc 101, using two probes 9 and 10, a positive and a negative signal pulse which can be processed in the manner described heretofore.

In order to optically scan after cooling the discolored region surrounding the weld seam it is possible, of course, to use a disc with rotating sensing probes. As described hereinabove, a rotating disc with aperture is used. Likewise a disc can be utilized also in all instances when arranging the disc axis to be normal to the tube axis and fitting the disc periphery with one or more probes adapted to scan the weld seam. This latter arrangement is characterized by the advantage that the heat produced in the weld seam heats the disc to a lesser degree since at any instant only a small spot of the disc periphery faces the weld seam.

It will be evident that the present invention is designed to investigate the possible existence of a paste weld condition in seamed tubes and that each of the various embodiments of the invention lends itself to be incorporated as a part of the manufacturing process. Therefore, the present invention and its illustrative examples constitute a major advance in the art for providing sound and reliable seamed tubes in accordance with ever higher quality and performance criteria.

The above described preferred embodiments are merely illustrative of the broad principle of the invention and it will be apparent to those skilled in the art that further embodiments and modifications may be made therein without departing from the concept and confines of the invention which shall be limited only by the scope of the appended claims.

I claim:

1. Apparatus for determining the quality of a longitudinally welded tube by investigating the dissipated heat energy responsive discoloration on the tube in the weld seam area during the manufacture thereof comprising:

a head adapted to rotate having a centrally disposed bore for receiving therein the welded tube which is fed axially through said bore while said head is rotating;

means coupled to said head for causing it to rotate;

photo responsive electrical sensing means disposed in said bore for rotation with said head and oriented to scan a surface portion of the tube in a direction transverse to the axis of the seam;

means disposed for illuminating the scanned surface portion whereby to cause said sensing means to receive light energy reflected from said scanned surface portion, and electrical circuit means coupled in circuit with said sensing means for producing, as the head is rotating and the tube is fed through the bore, an electrical signal indicative of the discoloration on the tube in the seam area produced during the preceding manufacture of the tube.

2. An apparatus for determining the quality of a welded tube as set forth in claim 1, said means for illuminating being secured to said head for rotation therewith; said photo responsive sensing means comprising a pair of sensing means responsive predominantly to light in the red region of the light spectrum, one sensing means disposed for scanning a respective surface portion and the other sensing means being inhibited from scanning the surface portion, and said electrical circuit means including means for producing a signal responsive to the imbalanced spectral condition effective upon said sensing means.

3. Apparatus for determining the quality of a longitudinally welded tube by investigating the heat dissipation caused discoloration on the tube surface in the weld seam area during the manufacture thereof comprising:

a head adapted to rotate having a centrally disposed bore for receiving therein the welded tube which is fed axially through said bore while the head is rotating;

means coupled to said head for causing it to rotate;
a pair of photo responsive sensing means responsive predominantly to light in the red region of the light spectrum, one sensing means disposed for scanning a respective surface portion and the other sensing means being inhibited from scanning the surface portion;
means for illuminating the scanned surface portion secured to said head for rotation therewith, whereby to cause said sensing means to receive light energy reflected from such surface portion, and
electrical circuit means coupled in circuit with said sensing means for producing during each rotation of the head as the tube, substantially at ambient temperature, is fed through the bore, a signal responsive to the imbalanced spectral condition effective upon said sensing means, which signal is a pulse whose amplitude is responsive to blue discoloration exhibited by the tube in the area of the weld seam.

4. An apparatus for determining the quality of a welded tube as set forth in claim 3, and additional circuit means coupled for transforming the head rotation responsive cyclically occurring pulse signals to a continuous electrical signal.

* * * * *